United States Patent
Edmonson et al.

(10) Patent No.: US 11,702,163 B2
(45) Date of Patent: Jul. 18, 2023

(54) FORWARD FACING VEHICLE TRANSPORT SYSTEM

(71) Applicant: Ironman FFB, LLC, Edmond, OK (US)

(72) Inventors: Tommy Edmonson, Choctaw, OK (US); Phil Carson Coldiron, Edmond, OK (US)

(73) Assignee: Ironman FFB, LLC, Norman, OK (US)

( * ) Notice: Subject to any disclaimer, the term of this patent is extended or adjusted under 35 U.S.C. 154(b) by 526 days.

(21) Appl. No.: 16/728,084

(22) Filed: Dec. 27, 2019

(65) Prior Publication Data
US 2020/0207433 A1 Jul. 2, 2020

Related U.S. Application Data

(63) Continuation of application No. 16/235,020, filed on Dec. 28, 2018, now Pat. No. 10,773,762.

(51) Int. Cl.
*B62D 63/06* (2006.01)

(52) U.S. Cl.
CPC .................. *B62D 63/065* (2013.01)

(58) Field of Classification Search
CPC ... B62D 63/065; B62D 63/061; B62D 53/062
See application file for complete search history.

(56) References Cited

U.S. PATENT DOCUMENTS

| | | | | |
|---|---|---|---|---|
| 2,197,401 | A * | 4/1940 | Weber | B62D 53/067 280/789 |
| 3,837,665 | A * | 9/1974 | Schramm | B62D 63/062 414/476 |
| 3,837,673 | A | 9/1974 | McCarthy | |
| 3,881,749 | A * | 5/1975 | Berends | B62D 53/0864 280/901 |
| 3,987,919 | A | 10/1976 | Weeks et al. | |
| 4,033,625 | A * | 7/1977 | Fikse | B60P 1/18 298/22 R |
| 4,132,326 | A | 1/1979 | Pinto | |
| 4,317,579 | A | 3/1982 | Louw | |
| 4,348,054 | A | 9/1982 | Shonkwiler et al. | |
| 4,372,572 | A * | 2/1983 | Verschage | B60P 1/027 414/495 |
| 4,493,491 | A | 1/1985 | Karlik | |
| 4,569,531 | A | 2/1986 | Beadle | |
| 4,632,629 | A * | 12/1986 | Kooima | B60P 3/125 280/402 |
| 4,635,742 | A * | 1/1987 | Bertolini | B62D 53/067 180/209 |
| 4,650,205 | A | 3/1987 | Jarlsson | |
| 4,737,066 | A * | 4/1988 | Allison, Jr. | B60P 3/125 D34/28 |

(Continued)

*Primary Examiner* — Kevin Hurley
*Assistant Examiner* — Michael R Stabley
(74) *Attorney, Agent, or Firm* — Hall Estill Law Firm (57) ABSTRACT

A transport system can employ a transport assembly with a main support member attached to a mounting connection, a tow connection, a suspension, and a horizontal articulation mechanism. The horizontal articulation mechanism may be configured to raise the suspension of a ground surface along a first direction and move the main support member in a second direction with the first direction being orthogonal to the second direction.

20 Claims, 10 Drawing Sheets

(56) References Cited

U.S. PATENT DOCUMENTS

| | | | | |
|---|---|---|---|---|
| 4,778,333 A * | 10/1988 | Youmans | ................ | B60P 3/125 280/402 |
| 4,842,472 A * | 6/1989 | Plant | ...................... | B60P 3/125 280/402 |
| 4,943,202 A | 7/1990 | Galloway | | |
| 4,958,845 A * | 9/1990 | Parks | ................... | B62D 53/067 280/407.1 |
| 5,013,056 A | 5/1991 | Landoll et al. | | |
| 5,016,897 A * | 5/1991 | Kauffman | ............... | B60P 3/127 414/537 |
| 5,249,911 A * | 10/1993 | Marola | ............. | B62D 53/0828 280/402 |
| 5,326,215 A * | 7/1994 | Eberhardt | ................ | B60P 3/07 414/494 |
| 5,566,964 A * | 10/1996 | Leonard | ............... | B62D 53/061 280/423.1 |
| 5,667,231 A | 9/1997 | Dierks et al. | | |
| 5,863,059 A | 1/1999 | Waggoner | | |
| 6,036,207 A | 3/2000 | Oehlerking et al. | | |
| 6,036,428 A * | 3/2000 | Kooima | ................... | B60P 3/125 280/433 |
| 6,287,061 B1 | 9/2001 | Tinnell | | |
| 6,461,096 B1 * | 10/2002 | Mentele | .................. | B60P 3/122 414/480 |
| 6,786,158 B2 | 9/2004 | Jacob | | |
| 6,857,376 B2 | 2/2005 | Coslovi et al. | | |
| 6,886,362 B2 | 5/2005 | Wilding et al. | | |
| 6,893,205 B2 | 5/2005 | Heim et al. | | |
| 6,901,728 B2 | 6/2005 | Keiderman | | |
| 6,902,368 B2 | 6/2005 | Hagenzieker | | |
| 6,969,104 B2 * | 11/2005 | Green | ................ | B62D 53/067 296/184.1 |
| 7,017,934 B2 * | 3/2006 | Harris | .................... | B60P 3/127 280/438.1 |
| 7,547,179 B1 | 6/2009 | Edmonson | | |
| 7,677,625 B2 * | 3/2010 | Gosselin | ................ | B62D 21/14 280/789 |
| 7,789,411 B2 * | 9/2010 | Schuettenberg | ....... | B60D 1/465 280/402 |
| 7,845,700 B2 * | 12/2010 | Gosselin | ................... | B60P 3/40 280/789 |
| 8,151,426 B2 * | 4/2012 | Schneider | ............. | B62D 21/20 29/401.1 |
| 8,267,419 B2 * | 9/2012 | Schuettenberg | ......... | B60D 1/52 280/490.1 |
| 8,353,521 B1 * | 1/2013 | Seeley | ................ | B62D 53/061 280/417.1 |
| 8,622,413 B2 * | 1/2014 | Schuettenberg | ....... | B60D 1/486 280/402 |
| 9,114,677 B2 * | 8/2015 | Schuettenberg | ......... | B60D 1/488 |
| 9,381,958 B2 * | 7/2016 | Schuettenberg | ......... | B60P 3/125 |
| 9,637,039 B1 * | 5/2017 | Vildosola | ................ | B60P 3/125 |
| 2004/0075242 A1 * | 4/2004 | Richards | .................. | B60D 1/40 280/491.2 |
| 2006/0072999 A1 * | 4/2006 | Manley, Sr. | ............ | B60P 3/125 414/563 |
| 2006/0119080 A1 * | 6/2006 | Damron | ............... | A01G 23/095 280/656 |
| 2007/0020073 A1 | 1/2007 | Chaddock | | |
| 2007/0098536 A1 * | 5/2007 | Kooima | ................... | B60P 3/125 414/563 |
| 2010/0084837 A1 * | 4/2010 | Quiring | ................... | B60D 1/06 280/491.5 |
| 2014/0035316 A1 * | 2/2014 | Reiman | ................. | B62D 35/02 296/180.4 |
| 2018/0162463 A1 * | 6/2018 | Lutz | .................... | B62D 13/025 |
| 2018/0170458 A1 * | 6/2018 | Morena | ................. | B62D 65/00 |

* cited by examiner

FORWARD FACING VEHICLE TRANSPORT SYSTEM

RELATED APPLICATION

This application is a continuation-in-part of copending U.S. patent application Ser. No. 16/235,020 filed Dec. 28, 2018 entitled "Forward Facing Vehicle Transport Apparatus."

SUMMARY

A transport system, in accordance with various embodiments, has a transport assembly with a main support member attached to a mounting connection, a tow connection, a suspension, and a horizontal articulation mechanism. The horizontal articulation mechanism is configured to raise the suspension of a ground surface along a first direction and move the main support member in a second direction with the first direction being orthogonal to the second direction.

In other embodiments, a transport assembly is connected to a tow vehicle via a tow connection and to a transport vehicle via a mounting connection with the transport assembly consisting of a main support member attached to the mounting connection, the tow connection, a suspension, and a horizontal articulation mechanism. The horizontal articulation mechanism configured to raise the suspension of a ground surface along a first direction and move the main support member in a second direction with the first direction being orthogonal to the second direction.

A transport system can be operated, in some embodiments, by positioning a transport assembly relative to a transport vehicle with the transport assembly consisting of a main support member attached to a mounting connection, a tow connection, a suspension, and a horizontal articulation mechanism. The suspension is raised off the ground with the horizontal articulation mechanism in a first direction before the main support member is moved in a second direction with the horizontal articulation mechanism. The first direction being orthogonal to the second direction.

DETAILED DESCRIPTION

Reference will now be made in detail to one or more examples of the technology depicted in the figures. Each example is provided by way of explanation of the various embodiments, and not meant as a limitation. For example, features illustrated or described as part of one embodiment may be used with another embodiment to yield still a different embodiment. Other modifications and variations to the described embodiments are also contemplated within the scope and spirit of the present disclosure.

Assorted embodiments of the present disclosure are generally directed to vehicle transport equipment that optimizes the transport of a forward facing vehicle.

While transporting a light duty vehicle, such as a sports car or half-ton pickup truck, can be conducted with a variety of different towing vehicles, the transportation of heavy duty vehicles, such as semi-trucks, can be dangerous if not conducted with specialty equipment. The existence of heavy duty towing vehicles may be practical for short distances, but are not practical or safe for long distances. Hence, many heavy duty vehicles are transported by being driven, which requires additional personnel and is wrought with inefficiency and expense. To address these inefficiencies, assemblies have been developed to transport heavy duty vehicles in a forward facing configuration that does not require an additional driver or compromised safety over long distances.

A forward facing vehicle transport assembly may be configured to allow additional vehicles to be concurrently transported, which can correspond with highly efficient transport of two heavy duty vehicles. Due to the robust capabilities of a forward facing vehicle transport assembly, movement and connection of an assembly to a vehicle to be transported can be difficult and time consuming. Often in an effort to save time, proper vehicle connection is sacrificed, which increases the risk of damage and/or injury during transport. Hence, there is a continued need to improve the efficiency of forward facing vehicle transport assembly movement and connection.

Accordingly, assorted embodiments of a forward facing vehicle transport system provide a lateral articulation mechanism that complements a vertical articulation mechanism to allow a single user to efficiently move, position, and hook up a transport vehicle to a transport assembly. The ability to easily move a transport assembly laterally can increase the accuracy and precision of assembly placement relative to the transported vehicle, which increases the likelihood that the vehicle is correctly, and safety, attached to the transport assembly.

Figure 1:
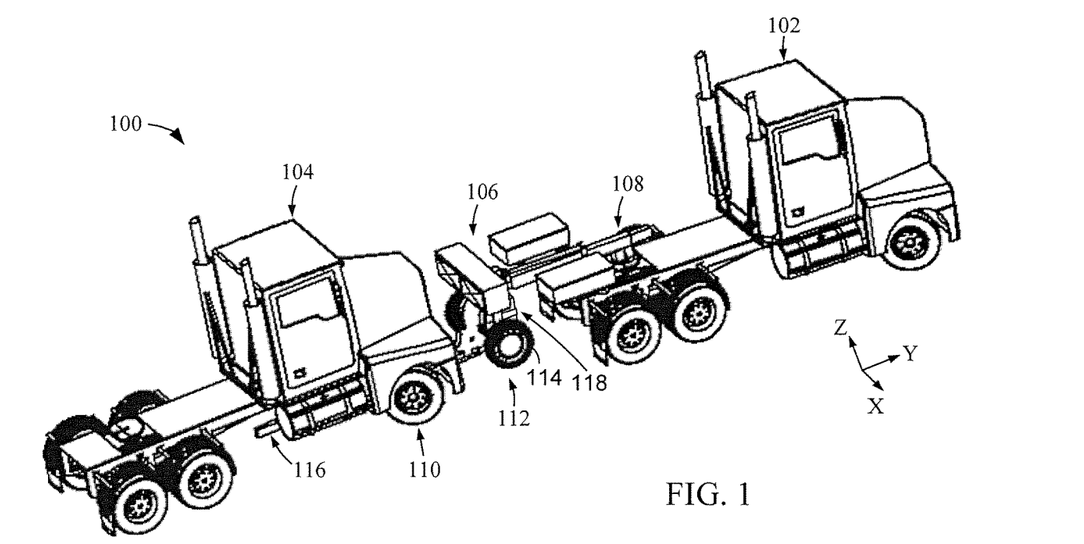
FIG. 1 depicts portions of an example forward facing vehicle transport system in which various embodiments can be practiced.

FIG. 1 depicts portions of an example forward facing vehicle transport system 100 arranged in accordance with some embodiments. The system 100 has a tow vehicle 102 connected to a transport vehicle 104 via a transport assembly 106. Although any type of vehicle can be used as the respective tow 102 or transport 104 vehicles, heavy duty semi-trucks can be employed to provide long haul transport capabilities.

The transport assembly 106 can be configured to connect to a fifth wheel hitch 108 of the tow vehicle 102 and to a front suspension 110 of the transport vehicle 104. It is contemplated that the transport assembly 106 has a suspension 112 that can provide one or more wheels 114 and/or other load distributing components, such as shocks, struts, springs, or pneumatic pistons. The view of FIG. 1 illustrates how an extension portion 116 of the transport assembly 106 can cantilever to engage portions of the undercarriage of the transport vehicle 104, such as the frame, body, drive shaft, wheels, and engine. The perspective view of FIG. 1 further illustrates how the transport assembly 106 can consist of various fine resolution adjustment equipment 118, which can be individually and/or collectively activated to provide elevational (Z axis), horizontal (X axis), and vertical (Y axis) movement.

Figure 2:
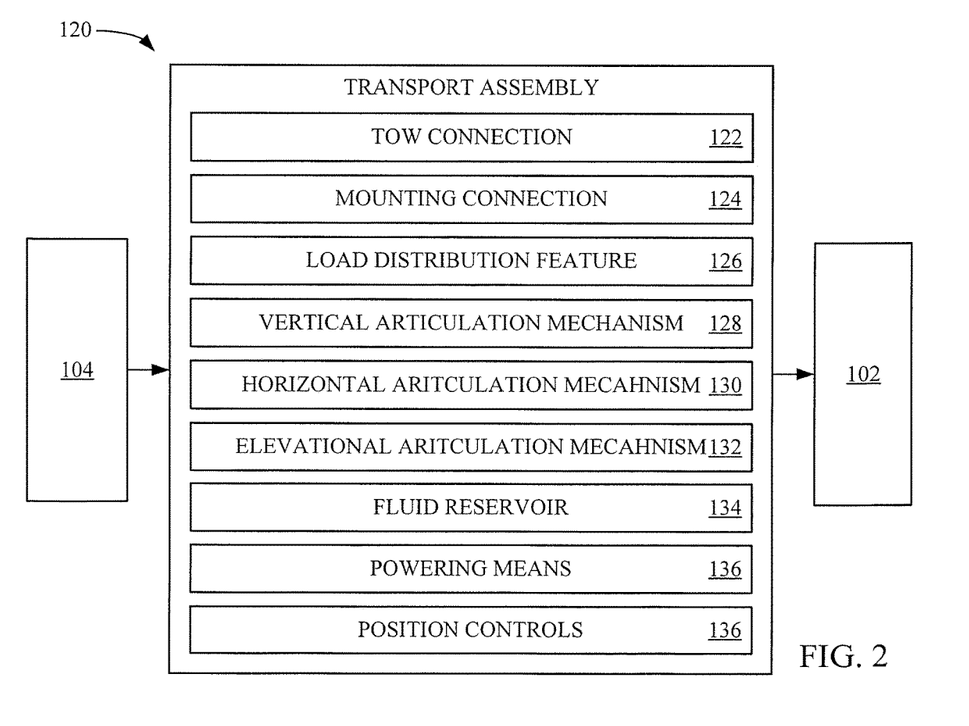
FIG. 2 depicts a block representation of an example vehicle transport assembly configured in accordance with some embodiments.

FIG. 2 depicts a block representation of an example transport assembly 120 that can be employed in a front facing vehicle transport system in accordance with various embodiments. As shown in FIG. 1, the transport assembly 120 can be the physical connection between a tow vehicle 102 and a transport vehicle 104 oriented in a front facing configuration. The transport assembly 120 has a tow connection 122, such as a fifth wheel ball or hitch, to physically contact the tow vehicle 102 and a mounting connection 124 configured to physically secure the transport vehicle 104.

The transport assembly 120 has a load distribution feature 126, which is shown as a pair of wheels in FIG. 1, but is not limited to a wheeled configuration. Despite having wheels as part of the load distribution feature 126, the transport assembly 120 can be cumbersome and difficult to maneuver, particularly between tow 102 and transport 104 vehicles. That is, precise maneuvering the transport assembly 120 with respect to the tow connection 122 and the undercarriage of the transport vehicle 104 can be difficult and time consuming at least due to the size, shape, and weight of the transport assembly 120. If the transport assembly 120 relied on the load distribution feature 126 for such precise maneuvering, the physical connection of the tow vehicle 102 to the transport vehicle 104 would be jeopardized and can be loose, unsafe, and prone to damage to the respective vehicles 102/104.

The difficulties in maneuvering the transport assembly 120 can be mitigated by providing a vertical articulation mechanism 128, a horizontal articulation mechanism 130, and an elevational articulation mechanism 132. It is contemplated that the respective articulation mechanisms 128/130/132 can be manually operated mechanical equipment, such as a screw jack. However, various embodiments arrange each articulation mechanism 128/130/132 as powered units, such as hydraulic or pneumatic pistons. Such powered units have a fluid reservoir 134 and at least one powering means 136, such as a motor or compressor, that supplies the respective articulating aspects of the powered units.

In some embodiments, the vertical 128, horizontal 130, and elevational 132 articulation mechanisms are a single powered unit capable of articulating in multiple different directions, such as orthogonal directions. The single powered unit can be efficient with regards to size, but can be prone to performance degradation in the articulating components that move at least in orthogonal directions. In contrast, configuring the vertical 128, horizontal 130, and elevational 132 articulation mechanisms as separate powered units, which may share or have separate fluid reservoirs 134, with separate powering means 136 allows for simple longitudinal piston operation with consistent and reliable performance over time.

By configuring the respective articulation mechanisms 128/130/132 as separate powered units, operation can be simplified to separate vertical and lateral position controls 138. Compared to a single control that may confuse a user as to the movement of the transport assembly 120, separate controls 138 can be oriented and/or labeled so that the resultant transport assembly 120 movement is readily apparent, which increases the efficiency and safety of transport assembly 120 connection and disconnection.

Figure 3A:
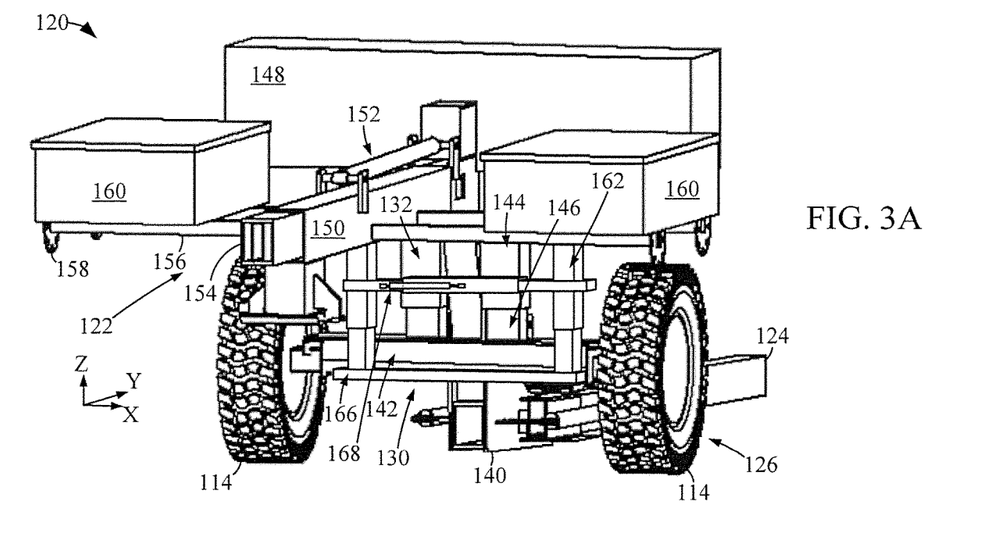
FIGS. 3A-3D respectively depict assorted portions of an example transport assembly that can be utilized in the vehicle transport system of FIG. 1.
Figure 3B:
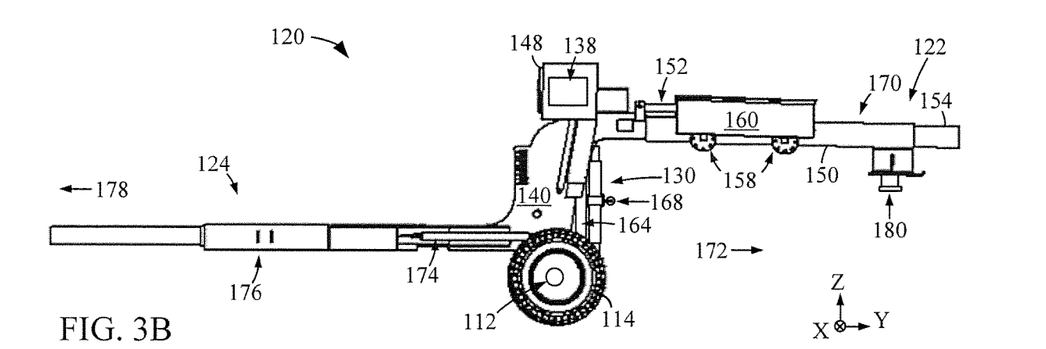
Figure 3C:
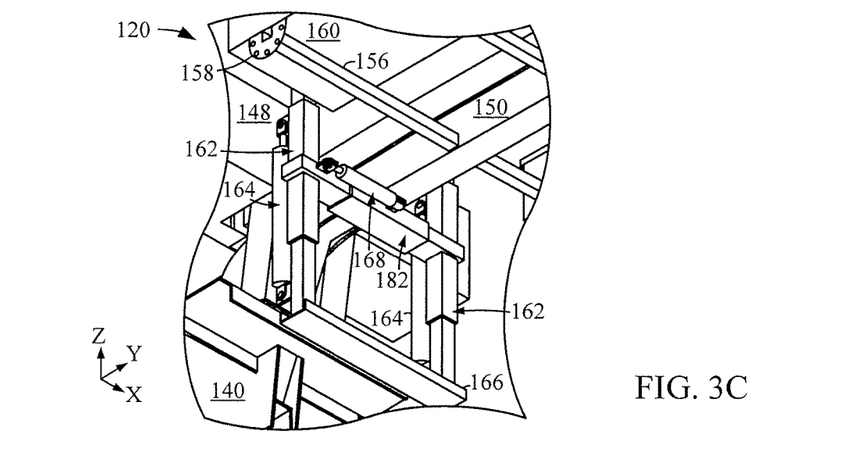

FIGS. 3A-3C respectively depict portions of an example transport assembly 120 that can be utilized as part of a forward facing vehicle transport system. The transport assembly 120 has a rigid main support member 140 to which the mounting connection 124 and tow connection 122 are each attached. The perspective view of FIG. 3A displays how the load distribution feature 126 has a pair of wheels 114 mounted to an axle 142. It is contemplated that the load distribution feature 126 has independent suspensions for the respective wheels 114 and/or one or more shock absorbing members, such as shocks, springs, struts, or pneumatic pistons, but such arrangements are not required.

The load distribution feature 126 may be connected to the main support member 140 via the vertical articulation mechanism 128 that enables the wheels 114 to be moved along the Z axis relative to a ground surface, which allows the respective connections 122/124 to be raised or lowered on demand. Although not required or limiting, the vertical articulation mechanism 128 can consist of a vertical slide member 144 that moves in relation to a guide post 146 in response to activation of a piston acting on the guide post 146 and/or slide member 146.

The main support member 140 is attached to a control housing 148 where various aspects of the respective articulation mechanisms 128/130/132 are placed. As a non-limiting example, the control housing 148 provides environmental protection for the fluid reservoir(s), powering means, and controls that enable operation of the respective articulation mechanisms 128/130/132. It is noted that the control housing 148 may be any size, shape, and material that is conducive to protecting the internal equipment while allowing physical access for user access, such as for repair or replacement.

The tow connection 122 is connected to the main support member 140 by an extension member 150 that may have a static or dynamic position. That is, the extension member 150 can be moved by an extension mechanism 152 along a reinforcement 154, parallel to the Y axis, to position the tow connection 122. It is contemplated that the extension mechanism 152 is manual, such as a pinned rod, hydraulic, or pneumatic. Similarly, the mounting connection 124 can be articulated along the Y axis via one or more manual, hydraulic, or pneumatic mechanisms.

As shown in FIG. 3A, the extension member 150 can support four separate axle receivers 156 that are configured as hollow cantilevered protrusions where an axle of the transport vehicle 104 can be positioned during transport. An axle can be attached to a mounting flange 158 of a receiver 156 with the lugs used to mount wheels to the axle. While not required or limiting, the axle receivers 156 can provide a base for storage boxes 160, which can protect any equipment from the environment.

The transport assembly 120 has a horizontal articulation mechanism 130 that can be a stand-alone unit or a combination of the elevational 132 articulation mechanism. The non-limiting configuration of the horizontal articulation mechanism 130 in FIG. 3A has a pair of supports 162 that can telescope in response to one or more elevational pistons 164 to engage a support 162 connecting rail 166 with the ground. Activation of the elevational pistons 164 can move the connections 122/124 along the vertical position, but in some embodiments, is limited to an elevational range that lifts the wheels 114 enough to allow a horizontal piston 168 to move the connections 122/124 along the horizontal (X axis) direction.

It is contemplated that the horizontal articulation mechanism 130 has multiple horizontal pistons 168 that provide fine resolution adjustment of the position of the main body 140 and connections 122/124. Assorted embodiments utilize the horizontal articulation mechanism 130 to provide both elevational and horizontal connection 122/124 positioning without a separate elevational articulation mechanism 132. The ability to customize the respective articulation mechanisms 128/130/132 allows for efficient use of the physical space, controls, and powering means to provide fine positional control of the position of the respective connections 122/124, such as inch-by-inch resolution.

The side view of FIG. 3B illustrates how the various aspects of the transport assembly 120 are arranged. The tow connection 122 is configured with a tow tongue 170 that has an extension member 150 capable of being moved by an extension mechanism 152 in a first direction 172 along the Y axis. The extension mechanism 152 for the tow tongue 170 can operate independently, or concurrently with a mounting connection 124 extension mechanism 174 that moves a mounting extension member 176 in a second direction 178 along the Y axis, which is in the opposite vector from the kingpin 180 and direction 172 along the Y axis.

FIG. 3C depicts a perspective view of the horizontal articulation portions of the transport assembly 120 that is constructed and operated in accordance with various embodiments to provide both elevational (Z axis) and horizontal (X axis) motion. It is noted, but not required or limiting, that the horizontal articulation mechanism 130 of FIG. 3C is employed as the sole elevational movement means, in contrast to the dual elevational capabilities shown in FIG. 3A from the elevational pistons 164 and telescoping slide member 144.

The non-limiting example of the horizontal articulation mechanism 130 of FIG. 3C conveys how multiple elevational pistons 164 can be employed to extend the rail 166 towards the ground. One or more horizontal pistons 168 are connected to a telescoping horizontal support 182 that moves the main support body 140, tow connection 122, and mounting connection 124 along the X axis upon activation. It is contemplated that a single piston 168, or multiple horizontal pistons 168, can be utilized to provide bidirectional articulation along the X axis.

It is noted that the horizontal articulation mechanism 130 attaches the horizontal piston(s) 168 to a telescoping portion of the horizontal support 182 and a fixed portion of the horizontal support 182, which allows activation of the piston(s) 168 to move the main support member 140 and connections 122/124 relative to the supports 162 and rail 166. The configuration of the horizontal articulation mechanism 130, as shown in FIG. 3C, can optimize the practicality and reliability of the transport assembly 120 by providing dual axis movement (Z/X) with a single support structure.

Figure 3D:
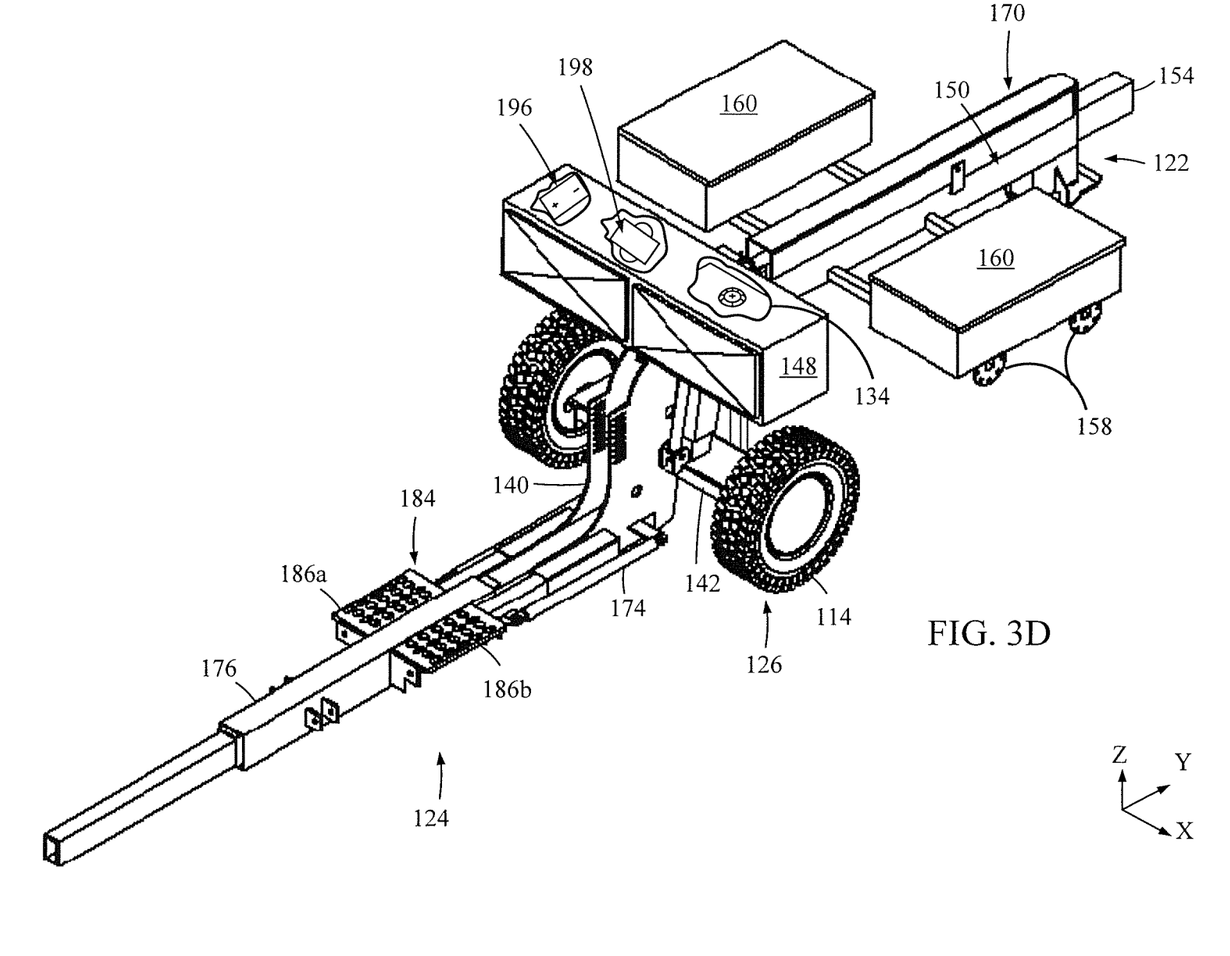

In the perspective view of FIG. 3D, the mounting connection 124 of the transport assembly 120 is more clearly displayed. The mounting connection 124 has an axle cradle 184 that physically engages portions of the transport vehicle 104 at least with cradle platforms 186a and 186b. The axle cradle 184, and platforms 186a/186b, can be any size, shape, and material that can securely attach the extension member 176 to a transport vehicle. In some embodiments, the cradle platforms 186a/186b is configured to physically secure a steering axle 188 of a transport vehicle 104, as shown in the non-limiting embodiment of FIG. 4. It is contemplated that the axle cradle 184 can be configured to concurrently, or separately attach to other portions of the transport vehicle 104, such as the front wheels 190, bumper 192, or frame 194.

Returning to FIG. 3C, the control housing 148 is shown to contain at least one battery 196 that can power one or more motors 198 (powering means) in response to control input from a user. It is contemplated that the motor(s) 198 can pump hydraulic fluid from one or more reservoirs 134 to power one or more hydraulic pistons configured to articulate portions of the transport assembly 120 in the vertical direction (Z axis), lateral direction (X axis), or tow directions 172/178 (Y axis).

Figure 4:
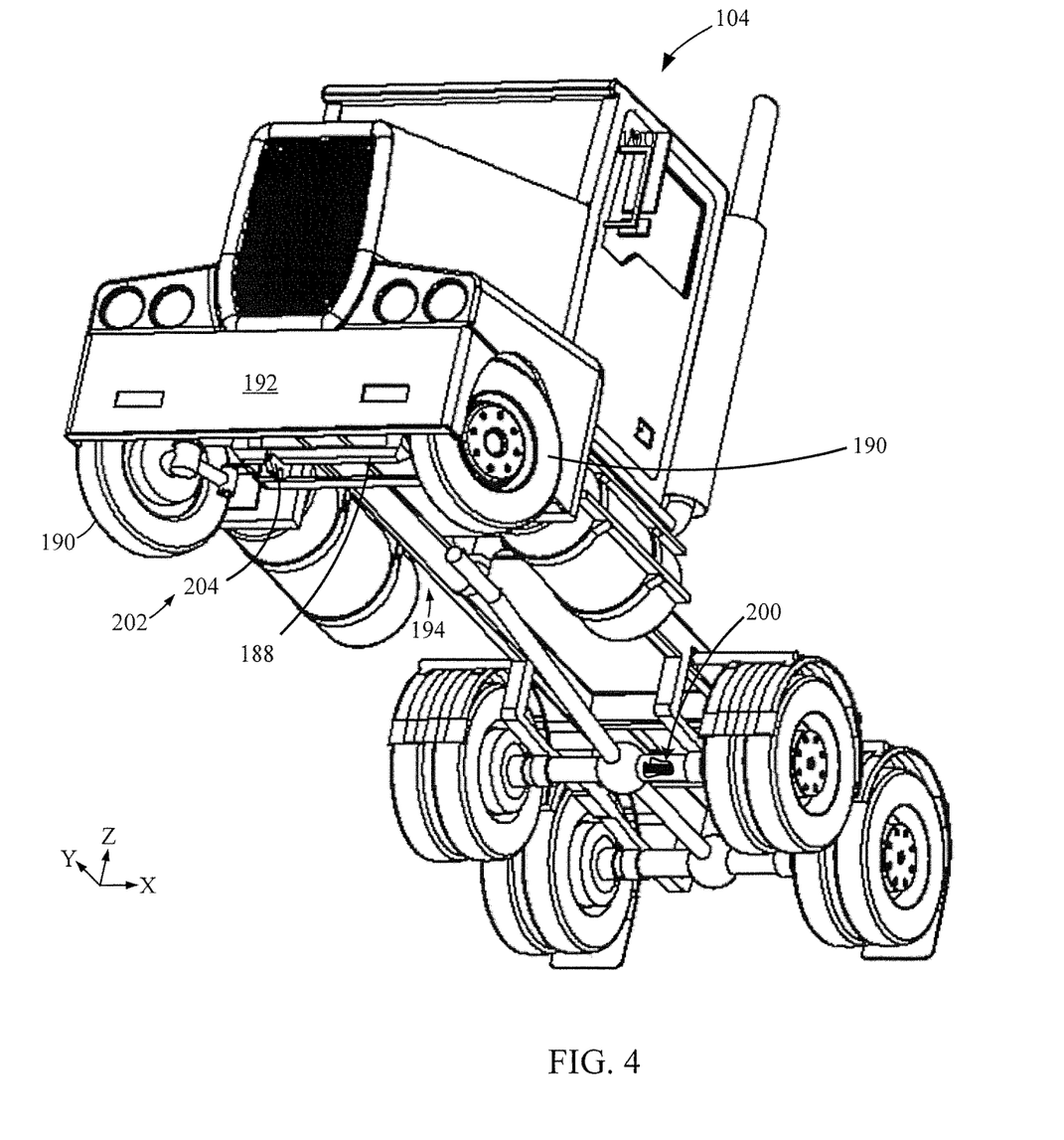
FIG. 4 depicts portions of an example transport vehicle that may be utilized in the transport system of FIG. 1.

In the non-limiting embodiment of a transport vehicle 104 in FIG. 4, portions of a heavy duty semi-truck are displayed. The vehicle 104 can employ multiple drive axles 200 that can be removed and stored in the respective axle receivers 156. The ability of a transport assembly 120 to be articulated in the tow direction, along the Y axis, allows the axle cradle 184 to physically engage a variety of different portions of the undercarriage, such as the frame 194, front suspension 202, or steering axle 188.

Figure 5:
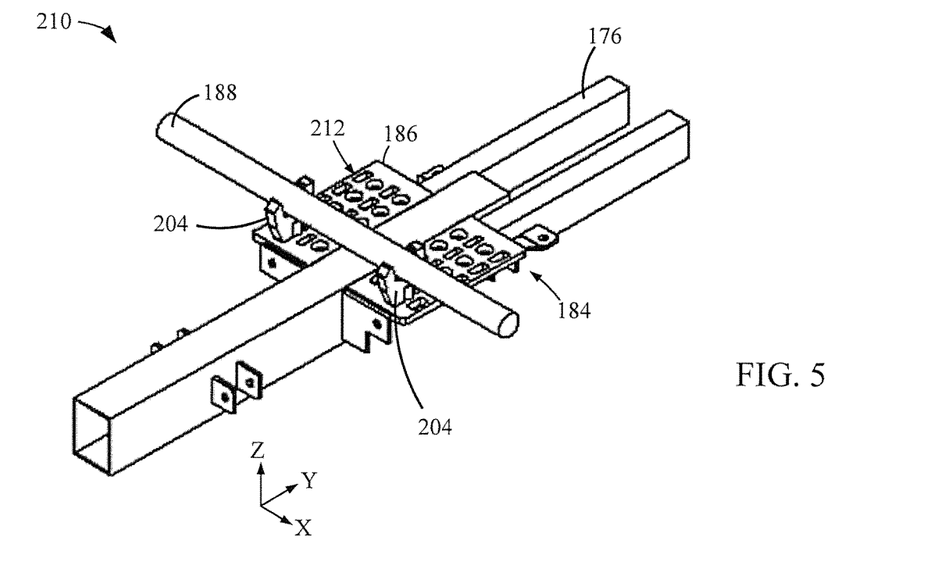
FIG. 5 depicts portions of an example transport assembly configured in accordance with some embodiments.

It is contemplated that the axle platforms 186 can attach to one or more tow tools 204 that securely contact and restrain a predetermined portion of the undercarriage of the transport vehicle 104. FIG. 5 depicts portions of a transport system 210 constructed and operated in accordance with some embodiments to safely tow a transport vehicle with a tow vehicle via a transport assembly. The connection of tow tools 204 to each cradle platform 186 transforms the axle cradle 184 into a receptacle for secure attachment with the steering axle 188 of the transport vehicle without disconnecting the steering axle from the transport vehicle. It is noted that each cradle platform 186 is arranged with a plurality of apertures 212 that can receive and secure a tow tool 204, which allows the tow tools 204 to be positioned in a variety of different configurations.

With the ability for a user to utilize different tow tools 204 at a variety of different positions on a cradle platform 186, a diverse range of secure physical connections can be made between a transport assembly and a transport vehicle. For instance, multiple tow tools 204 can be utilized to concurrently contact different aspects of a transport vehicle, such as the steering axle 188 and frame 194. As another non-limiting example, different tow tools 204 can be employed on the respective cradle platforms 186 to engage a steering axle 188, or other vehicle aspect, differently.

Figures 6, 7:
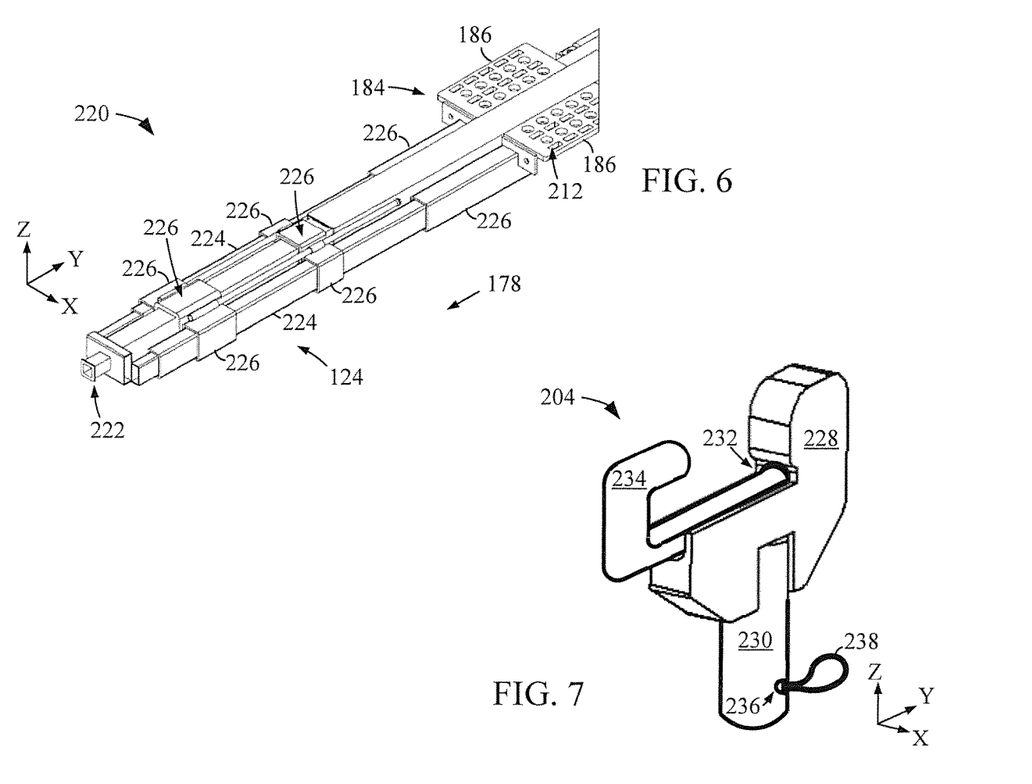
FIG. 6 depicts portions of an example transport assembly arranged in accordance with various embodiments.
FIG. 7 depicts portions of an example tow tool that can be employed in the transport system of FIG. 1.

The perspective view of FIG. 6 illustrates how the mounting connection 124 of a transport assembly 220 can be arranged in accordance with various embodiments. The axle cradle 184 is connected to a tow hitch 222 via a telescoping assembly comprising body 224 and guide 226 members that allow the hitch 222 to be selectively moved along the tow direction 178 and Y axis. The size, shape, and material of the assorted body members 224 provide ample rigidity and strength to allow the hitch 222 to securely attach to another vehicle, transport assembly, or towable assembly.

FIG. 7 depicts an example tow tool 204 that can be utilized as part of a transport assembly in accordance with various embodiments. A tow tool 204 is not required to be a specific size, shape, or material, but is intended to have ample rigidity and strength to safely secure several tons of weight. The exemplary tow tool 204 can have a main body 228 that is supported by an engagement member 230 configured to attach to a cradle platform 186.

The main body 228 can have a variety of different configurations. For instance, a main body 228 may be a single piece of material having a substantially U shape to surround a majority of the circumference of a connected axle. In the non-limiting embodiment shown in FIG. 7, the main body 228 has a groove 232 that receives a connection hook 234 and allows for hook 234 manipulation to completely surround a steering axle 188 by contacting a top portion of the main body 228.

It is contemplated that the engagement member 230 is loosely positioned within a cradle aperture 212 or fastened to the platform 186. A fastened configuration can involve the engagement member 230 have one or more threaded or smooth apertures 236 that is filled by a fastener 238 with enough strength to retain the tow tool 204 in position during transportation activity, such as long haul towing of one or more vehicles. As such, a fastener can be a threaded or smooth screw, bolt, pin, or rod.

Regardless of the connection of the tow tool 204 to an axle cradle 186, configuring the main body 228 to securely engage and retain a steering axle 188 with, or without, an articulating hook, optimizes the efficiency of installation and safety during operation. The ability to utilize one or more tow tools 204 can increase the customization of a transport assembly. Such customization can accommodate the towing of multiple vehicles concurrently. For instance, several differently configured tow tools 204 can simultaneously attach to assorted aspects of a transport vehicle to provide heightened load stability and retention during transport.

Figure 8:
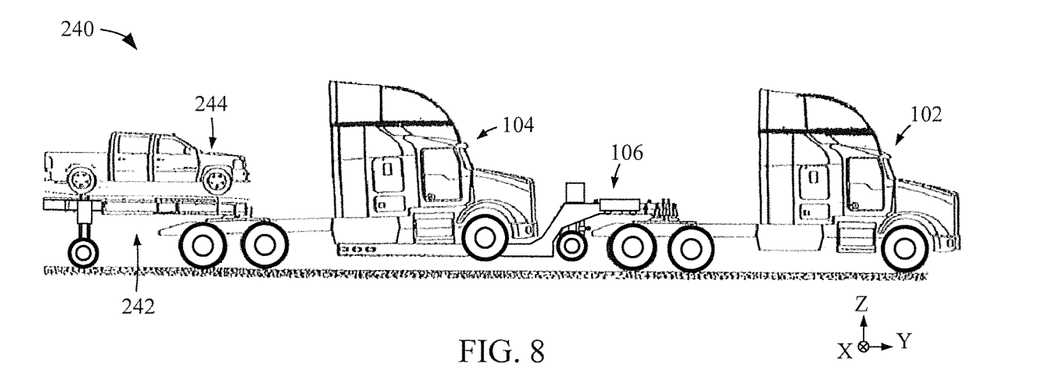
FIG. 8 depicts portions of an example forward facing vehicle transport system in accordance with various embodiments.

FIG. 8 depicts portions of an example transport system 240 that is operated in accordance with some embodiments to concurrently transport multiple vehicles. A transport assembly 106 is shown in operation physically securing a transport vehicle 104 so that the rear wheels contact the ground while the front suspension is raised off the ground. The hitch of the transport vehicle 104 is utilized to connect a return vehicle assembly 242 that safely tows a return vehicle 244 with none of the return vehicle 244 contacting the ground.

By suspending the entirety of the return vehicle 244 with the return vehicle assembly 242, the aerodynamics of the system 240 and load management during towing operations can be optimized. The ability to concurrently tow multiple vehicles drastically increases the efficiency of heavy duty vehicle transportation without compromising safety.

FIGS. 9A-9E respectively depict assorted aspects of an example return vehicle assembly 242 that can be employed in a transport system to transport one or more heavy duty vehicles. The side view of FIG. 9A conveys how the return vehicle assembly 242 can have a mounting connection 246 with a king pin 248 capable of engaging a fifth wheel hitch of a semi-truck. The mounting connection 246 is coupled to a tow bed 250 via a tongue 252. The tow bed 250 is supported by a tow suspension 254 that can consist of one or more wheels and tires 256.

Figure 9A:
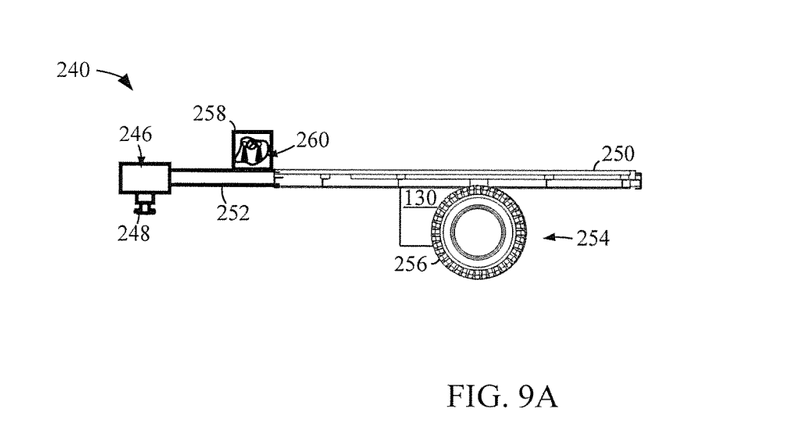
FIGS. 9A-9E respectively depict portions of an example return vehicle assembly that can be utilized in the transport system of FIG. 1.

It is contemplated that the tow bed 250 can be articulated with respect to the tongue 252 to provide tow direction movement of the bed 250 along the Y axis. Such articulation can consist of an articulation mechanism, such as a piston, gear, or chain, that is connected to a control box 258 where user controls 260 are located. The control box 258 can be configured to house any portion of the tow bed articulation mechanism, such as the battery power source, fluid reservoir, and motor in the case of a hydraulic mechanism or a pressure vessel, compressor, and battery power source in the case of a pneumatic mechanism.

Figure 9B:
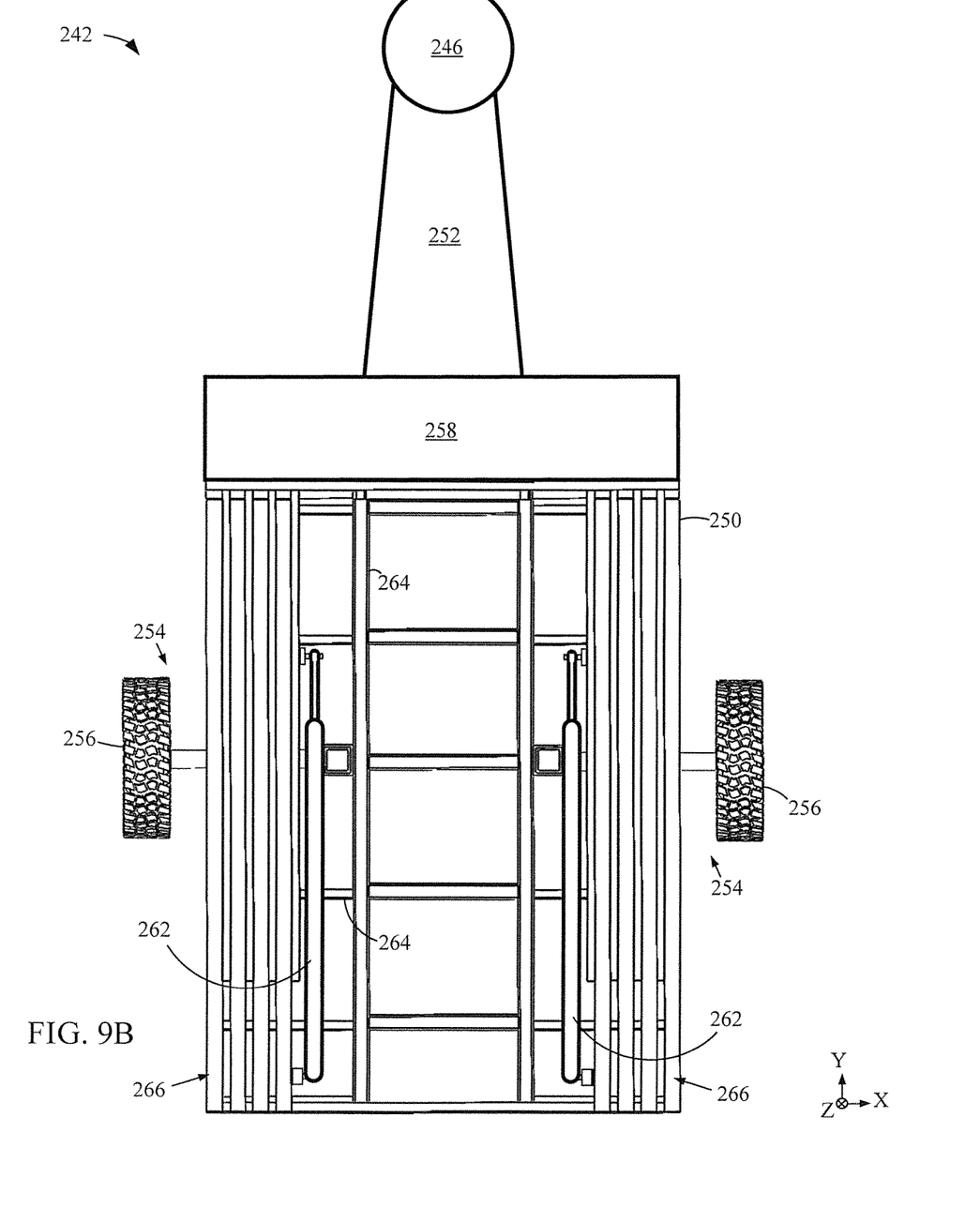
Figure 9C:
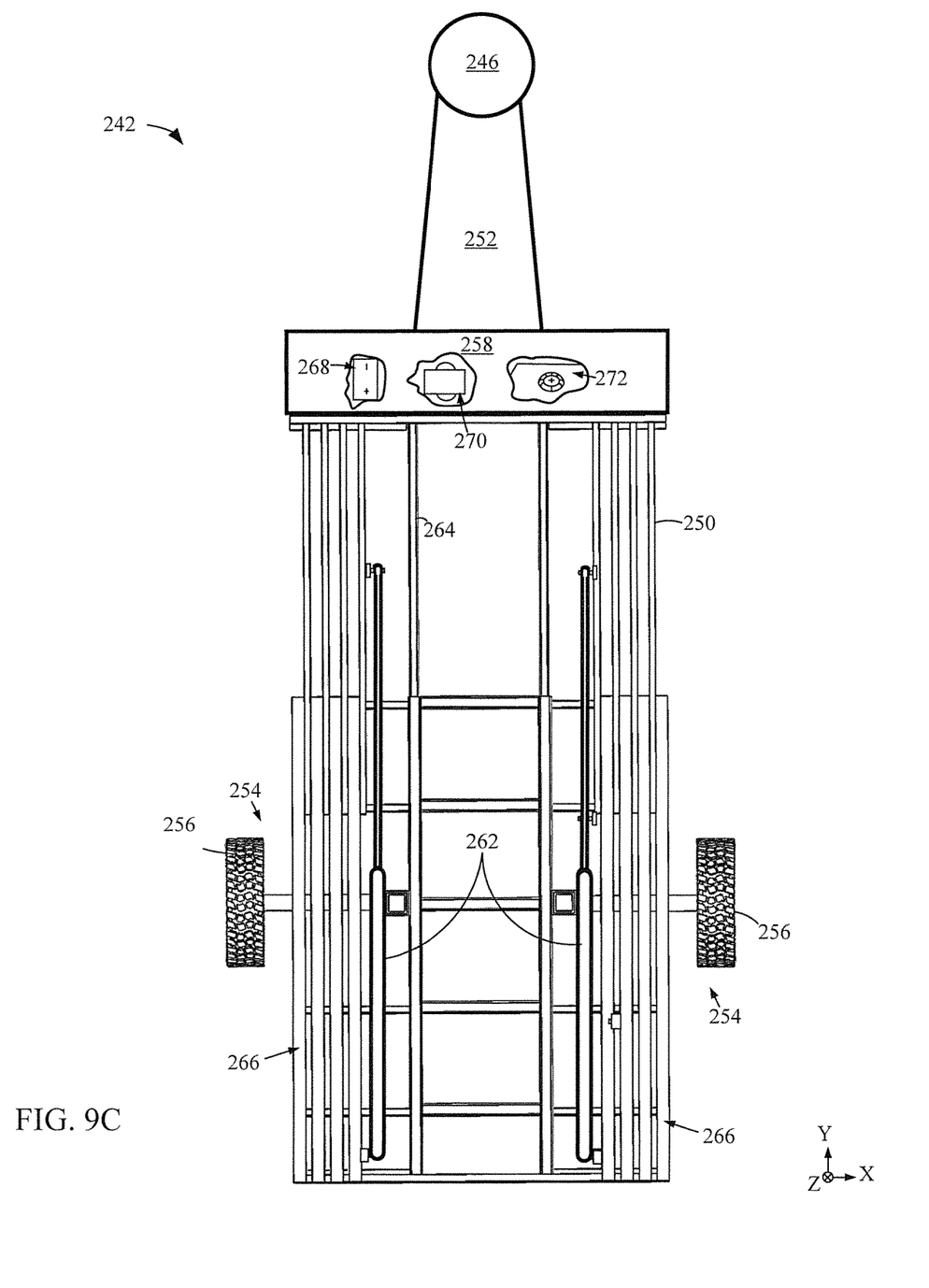

FIGS. 9B and 9C respectively convey top views of the example return vehicle assembly 242 operated in accordance with assorted embodiments. In the retracted mode of FIG. 9B, the bed articulation mechanism 262 has positioned the suspension 254 in a first position relative to the tongue 252 and mounting connection 246. The extended mode shown in FIG. 9C illustrates how the articulation mechanism 262 can be controlled to provide a range of suspension 254 positions relative to the mounting connection 246.

The extension of the tow bed 250 can involve the movement of extension features of the frame 264 and ramp 266. That is, the frame 264 and ramp 266 can each have nested components that can provide ample strength and rigidity to safely support a return vehicle during tow operations. The non-limiting embodiment of FIG. 9C shows how a battery 268 power source can be connected to a motor 270 in the control box 258 of the return vehicle assembly 242. The control box 258 may further house one or more fluid reservoirs 272 that supply hydraulic fluid to the controls and respective pistons of the articulation mechanism 262.

With the bed articulation mechanism 262, the frame 264 and ramp 266 each extend, or retract, in a controlled fashion, which can accommodate different return vehicle lengths as well as efficient return vehicle loading and unloading. It is contemplated that the tow bed 250 is attached to the suspension 254 with a tilting configuration where the bed 250 can rotate about the suspension 254 to allow a return vehicle to be driven onto the ramp 266. Other embodiments arrange the tow bed 250 with a fixed orientation parallel to the X-Y plane that is lowered with respect to the suspension 254 to allow for return vehicle loading and unloading.

Figure 9D:
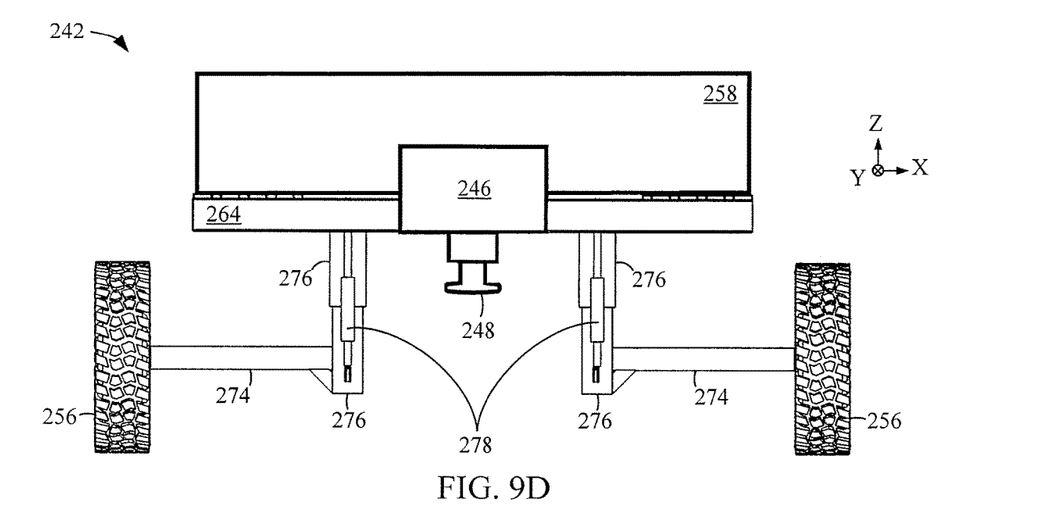
Figure 9E:
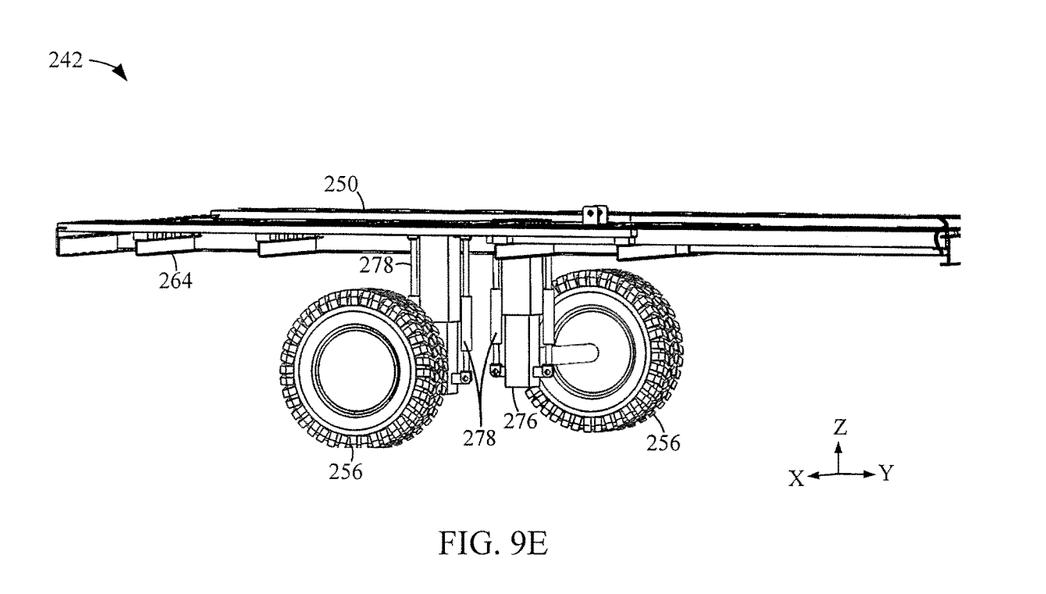

FIGS. 9D & 9E respectively convey how the suspension 254 of the return vehicle assembly 242 can provide vertical movement along the Z axis as well as lateral movement along the X axis. The suspension 254 can be supported by a single axle or by separate half-shafts 274 that respectively provide bearing engagement for the wheels and tires 256, as displayed in FIG. 9D. The half-shafts 274 can each connect to the frame 264 of the tow bed 250 via telescoping supports 276 that extend, or retract, in response to activation of the vertical pistons 278.

As shown in FIG. 9E, each telescoping support 276 can be engaged by multiple elevation pistons 278 that can provide tow bed 250 suspension during transportation and vertical manipulation during return vehicle loading and unloading. It is contemplated that the return vehicle assembly 242 has a horizontal articulation feature similar to the horizontal articulation mechanism 130 shown in FIGS. 3A-3D. Such a horizontal articulation feature can be positioned anywhere with respect to the frame 264 and tongue 252 to lift the suspension 254 off the ground and allow fine resolution movement along the X axis. A horizontal articulation feature can utilize a stand-alone powering and control arrangement or hook into the existing elevational controls 260 and powering means located in the control box 258.

Figure 10:
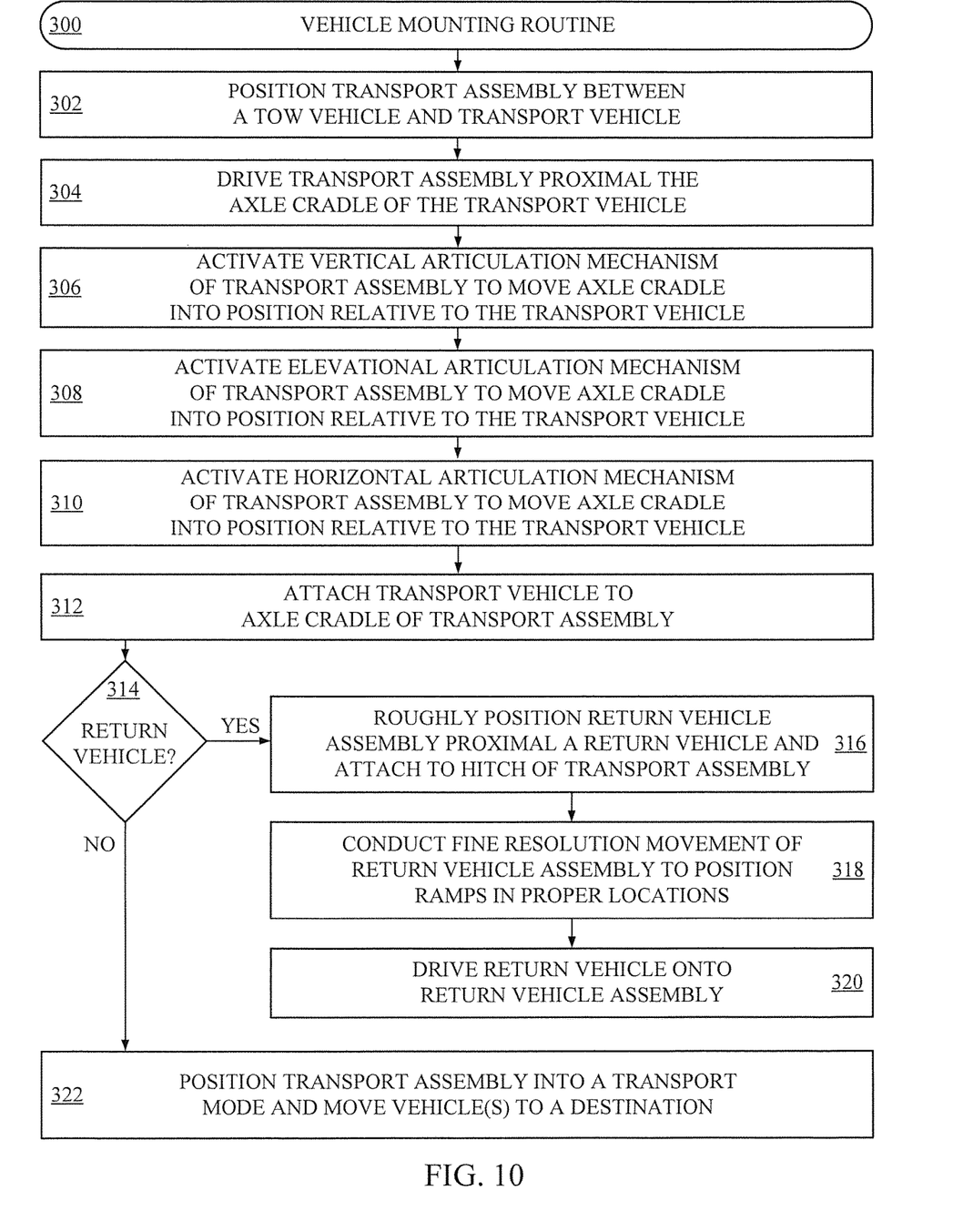
FIG. 10 depicts an example mounting routine that can be carried out by the embodiments of FIGS. 1-9E.

FIG. 10 is a flowchart of an example mounting routine 300 that can be conducted in accordance with various embodiments to securely connect at least one vehicle to a tow vehicle, as generally illustrated in FIGS. 1 & 8. It is noted that routine 300 provides a transport assembly with vertical and horizontal articulation capabilities. Initially, a transport assembly is positioned in step 302 relative to a tow vehicle. It is contemplated that the transport assembly is physically connected to the hitch of the tow vehicle or is disconnected from the tow vehicle.

With the transport assembly roughly positioned relative to a tow vehicle, step 304 drives a transport vehicle over an axle cradle portion of the transport assembly. It is contemplated that the axle cradle is equipped in step 304 with one or more tow tools that are arranged to attach to one or more aspects of the transport vehicle, such as the steering axle, bumper, frame, or suspension. Next, the position of the transport assembly can be manipulated by one or more articulation mechanisms to alter the vertical, elevation, and/or horizontal position of at least the axle cradle relative to the transport vehicle.

It is noted that the manipulation of portions of the transport assembly can be done in any order and/or concurrently, as directed by a user accessing one or more controls located on the transport assembly or controlled by a remote control. In step 306, the vertical articulation mechanism of the transport assembly is activated to move the axle cradle into position relative to the transport vehicle. Such vertical articulation is within the X-Y plane and parallel to the Y axis, which can be characterized as the tow directions 172/178.

The vertical manipulation of the axle cradle in step 306 may involve movement of the extension member attached to the axle cradle only and/or movement of the extension member attached to the mounting connection. The ability to separately extend the mounting connection and axle cradle increases positioning efficiency by eliminating the need to reposition the transport assembly if the range of motion of the axle cradle is insufficient.

The elevation of the transport assembly is manipulated in step 308 by activating a vertical articulation mechanism. The lowering, or raising, of the axle cradle by controlling the vertical articulation mechanism allows the tow tool(s) to be brought into contact with the undercarriage aspects of the transport vehicle from below, which can be advantageous compared to having to raise the transport vehicle to engage a tow tool.

Although the rough placement of the transport assembly in step 302 can be sufficient to align the tow tool(s) and axle cradle with the proper aspects of the transport vehicle undercarriage, such alignment is not guaranteed. Thus, step 310 can manipulate a horizontal articulation mechanism to alter the position of the tow tool(s) and axle cradle parallel to the X axis in the X-Y plane. The horizontal articulation mechanism can be configured to provide single, or dual, directional manipulation of the axle cradle.

In some embodiments, the horizontal manipulation of step 310 coincides with the elevational position of the transport assembly. That is, the horizontal manipulation may not be available until the transport assembly has an elevational position that positions a horizontal articulation support in contact with the ground. In other embodiments, the horizontal articulation mechanism can operate independent of the elevational position of the transport assembly.

It is noted that the vertical, horizontal, and elevation manipulation of steps 306/308/310 is not required, but can selectively be conducted to orient an axle cradle in position relative to the transport vehicle to safely secure the transport assembly to the transport vehicle in step 312. Therefore, routine 300 may simply conduct one manipulation of the transport assembly or can execute multiple manipulations sequentially or concurrently with steps 306/308/310. The physical attachment of the transport assembly to the transport vehicle in step 312 may involve one or more user actions, such as manipulating portions of one or more tow tools, or installation of a supplemental attachment feature, such as a chain, strap, or rope, that ensures constant contact between the axle cradle and transport vehicle during transport.

The secure attachment of the transport vehicle to the tow vehicle via the transport assembly allows decision 314 to evaluate if a return vehicle is to be incorporated into the transport system. If so, step 316 roughly positions a return vehicle assembly proximal a return vehicle and connects to a hitch of the transport vehicle. Step 318 proceeds to conduct fine resolution movements with one or more articulation mechanisms of the return vehicle assembly to position tow bed ramps in proper position relative to a return vehicle. Such fine physical resolution can move the tow bed in vertical, elevational, and horizontal directions with hydraulic or pneumatic assistance in response to user engaging wired or wireless controls.

With the tow bed in alignment with the wheels of the return vehicle, step 320 drives the return vehicle onto the tow bed. It is noted that the tow bed may be tilted or parallel to the ground during step 320 to facilitate efficient and safe loading of the return vehicle. The return vehicle, and tow bed, are positioned in a transport position, as generally shown in FIG. 7, in step 320 by manipulating one or more the articulation mechanisms of the return vehicle assembly that provide vertical, elevation, and horizontal movement.

At the conclusion of step 320, or in the event no return vehicle is to be employed from decision 314, step 322 positions the transport assembly in a transport position, as generally shown in FIGS. 1 & 8, where at least the front suspension of the transport vehicle are off the ground. The activity of step 322 can involve the sequential, or concurrent, activation of one or more articulation mechanisms of the transport assembly. The collective transport system is then utilized to move to a destination, which can be any distance from the loading location where the various steps of routine 300 take place, such as hundreds of miles.

Once at the destination, various aspects of routine 300 can be revisited to unload the transport vehicle from the transport assembly and tow vehicle. Once unloaded, it is contemplated that the transport assembly can connected to a hitch of the return vehicle to deliver two heavy duty semi-trucks to the destination. Regardless of the number of vehicles transported to the destination, the ability to manipulate the transport, and return, vehicle assemblies in vertical, elevational, and horizontal directions can optimize vehicle unloading speed, safety, and reliability.

With respect to the above description, it is to be realized that the optimum dimensional relationships for the parts of the technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the disclosed embodiments.

Further, it will be clear that the present technology is well adapted to attain the ends and advantages mentioned as well as those inherent therein. While presently exemplary embodiments have been described for purposes of this disclosure, numerous changes may be made which will readily suggest themselves to those skilled in the art and which are encompassed by the appended claims.

What is claimed is:

1. A transport assembly comprising:
   a main support member attached to a mounting connection and a tow connection, the mounting connection engaging a steering axle of a transport vehicle;
   a suspension attached to the main support member; and
   a horizontal articulation mechanism configured to raise the suspension off a ground surface along a first direction and move the main support member in a second direction, the first direction orthogonal to the second direction.

2. The transport assembly of claim 1, wherein the tow connection is a kingpin.

3. The transport assembly of claim 1, wherein the mounting connection comprises an axle cradle with a first platform and a second platform attached to opposite sides of an extension member of the mounting connection.

4. The transport assembly of claim 1, wherein the tow connection comprises a first telescoping extension member and the mounting connection comprises a second telescoping extension member.

5. The transport assembly of claim 4, wherein the first telescoping member is arranged to move in a third direction and the second telescoping member is arranged to move in a fourth direction, the third and fourth directions being opposite and orthogonal to the first direction and the second direction, respectively.

6. The transport assembly of claim 4, wherein the first telescoping member is connected to a first piston, the second telescoping member connected to a second piston.

7. The transport assembly of claim 6, wherein each piston is connected to a motor, a fluid reservoir, and a manual control positioned in a control box attached to the main support member.

8. The transport assembly of claim 1, wherein the suspension comprises a telescoping slide member connected to an elevational piston.

9. The transport assembly of claim 8, wherein the elevational piston is connected to a control that selectively moves the main support member in the first direction in response to activation of the elevational piston.

10. The transport assembly of claim 1, wherein the horizontal articulation mechanism comprises a horizontal support connecting first and second supports, the horizontal support attached to a horizontal piston positioned to move the supports in the second direction.

11. The transport assembly of claim 1, wherein the horizontal articulation mechanism comprises at least one elevational piston positioned to move the supports in the first direction.

12. The transport assembly of claim 1, wherein the horizontal articulation mechanism is positioned between a pair of wheels of the suspension.

13. A system comprising a transport assembly connected to a tow vehicle via a tow connection and to a transport vehicle via a mounting connection, the mounting connection engaging a steering axle of a transport vehicle, the transport assembly comprising a main support member attached to the mounting connection, the tow connection, a suspension, and a horizontal articulation mechanism configured to raise the suspension off a ground surface along a first direction and move the main support member in a second direction, the first direction orthogonal to the second direction.

14. The system of claim 13, wherein the mounting connection engages the steering axle via a first tow tool.

15. The system of claim 14, wherein the transport vehicle is attached to the mounting connection via a second tow tool engaging a frame of the transport vehicle.

16. The system of claim 14, wherein the transport vehicle is attached to the mounting connection via a second tow tool engaging a bumper of the transport vehicle.

17. The system of claim 14, wherein the first tow tool comprises an extension member that attaches to a platform of the mounting connection.

18. The system of claim 14, wherein the first tow tool comprises a hook member engaging a groove of a body member.

19. A method comprising:
    positioning a transport assembly relative to a transport vehicle, the transport assembly comprising a main support member attached to a mounting connection, a tow connection, a suspension, and a horizontal articulation mechanism, the mounting connection engaging a steering axle of a transport vehicle;
    raising the suspension off the ground with the horizontal articulation mechanism in a first direction; and
    moving the main support member in a second direction with the horizontal articulation mechanism, the first direction orthogonal to the second direction.

20. The method of claim 19, wherein moving the main support member in the second direction occurs in response to activation of a hydraulic piston of the horizontal articulation mechanism.

* * * * *